United States Patent
Henriot et al.

(10) Patent No.: US 8,081,080 B2
(45) Date of Patent: Dec. 20, 2011

(54) TURBO-MACHINE CONTROL INSTALLATION EQUIPPED WITH A PASSIVE RADIOFREQUENCY IDENTIFICATION CHIP UNIT VERIFICATION SYSTEM

(75) Inventors: Olivier Marie Henriot, Le Coudray Montceau (FR); Laurent Gilbert Yves Hodinot, Cesson (FR); Bertrand Lacombe, Paris (FR); Marc Raes, Brunoy (FR)

(73) Assignee: Hispano Suiza, Colombes (FR)

( * ) Notice: Subject to any disclaimer, the term of this patent is extended or adjusted under 35 U.S.C. 154(b) by 978 days.

(21) Appl. No.: 12/027,662

(22) Filed: Feb. 7, 2008

(65) Prior Publication Data
US 2011/0169640 A1    Jul. 14, 2011

(30) Foreign Application Priority Data
Feb. 9, 2007  (FR) ...................... 07 53177

(51) Int. Cl.
*G08B 13/14* (2006.01)
(52) U.S. Cl. ................. 340/572.7; 340/572.1; 340/10.1; 235/375; 235/435
(58) Field of Classification Search .............. 340/572.1, 340/572.7, 10.1, 5.92; 73/776, 114.01, 1.01; 235/385, 375, 376, 435
See application file for complete search history.

(56) References Cited

U.S. PATENT DOCUMENTS
7,042,346 B2 * 5/2006 Paulsen ................... 340/438
7,551,086 B2 * 6/2009 Coop et al. ............... 340/572.1
2005/0287386 A1 12/2005 Sabol et al.

FOREIGN PATENT DOCUMENTS
JP  2006-242924  9/2006

OTHER PUBLICATIONS
Wolf-Eckhart Bulst, et al., "State of the Art in Wireless Sensing With Surface Acoustic Waves", IEEE Transactions on Industrial Electronics, XP 011023793, vol. 48, No. 2, Apr. 2001, pp. 265-271.

* cited by examiner

Primary Examiner — Toan N Pham
(74) Attorney, Agent, or Firm — Oblon, Spivak, McClelland, Maier & Neustadt, L.L.P.

(57) ABSTRACT

This invention relates to a control installation (1) of a turbo-machine, comprising:
  a regulation device (2),
  a unit (4) located remotely from the device (2) by which it is controlled,
  a verification system (6) of the unit, comprising:
  an emitting/receiving antenna (8) connected to the device (2),
  a passive radiofrequency identification chip (12) mounted on the unit and incorporating information concerning this unit, wherein the chip (12) is designed to emit to the antenna (8) a radiofrequency signal comprising the information, in response to a radiofrequency signal sent by the antenna (8) to verify the unit,
The installation is such that the antenna (8) is mounted on the unit (4).

13 Claims, 5 Drawing Sheets

TURBO-MACHINE CONTROL INSTALLATION EQUIPPED WITH A PASSIVE RADIOFREQUENCY IDENTIFICATION CHIP UNIT VERIFICATION SYSTEM

This invention relates in general to turbo-machine control installations, preferably for aircraft.

It applies in particular to control installations comprising a FADEC (Full Authority Digital Engine Control) type turbo-machine regulation device, also called a regulation computer.

The purpose of the invention is to present a control installation which permits the electronic extraction of information concerning one or more turbo-machine units connected to the regulation device, such as hydro-mechanical units, fuel monitoring units, or any other unit, even mechanical, preferably to optimise the regulation of the turbo-machine by taking this information into account. Furthermore, for information, it may be envisaged to prevent the turbo-machine from starting if the information extracted and verified shows that at least one of the units concerned is non-compliant.

To achieve this, the subject of the invention is a control installation for a turbo-machine, comprising:
 a turbo-machine regulation device,
 at least one turbo-machine unit located remotely from said regulation device by which it is controlled, and to which it is electrically connected, and
 a verification system of said unit, wherein said system comprises:
 an emitting/receiving antenna electrically connected to said regulation device,
 a passive radiofrequency identification chip comprising an antenna and an electronic chip, wherein said passive radiofrequency identification chip is mounted on said unit and incorporates information concerning this same unit, wherein said passive radiofrequency identification chip is designed to emit to said emitting/receiving antenna a radiofrequency signal comprising said information, in response to a radiofrequency signal sent by said emitting/receiving antenna to verify said unit,
 said installation is also such that said emitting/receiving antenna is mounted on said unit, and said information concerning the unit comprises at least one of the following items of data:
 data concerning the characterisation de the unit, such as
 data concerning the properties of the unit, and/or the characteristics of this unit tested and measured on a test rig after it has been produced,
 data concerning the part number and serial number of the main components of the unit, respectively called P/N (Part Number) and S/N (Serial Number),
 data concerning the dates of manufacture and repair of the unit,
 data concerning the manufacturer of the unit, in the form of a specific encrypted code.

In this way, thanks to the presence of the verification system proposed, the installation according to the invention is effectively able to extract electronically information concerning one or several turbo-machine units connected to the regulation device, wherein the information verified by the regulation device preferably permits the regulation of the turbo-machine to be optimised.

Furthermore, using an identification chip by radiofrequency that is passive and contact-free permits the problems of certification, which are usually only required for active electronic type technological solutions. As a reminder, the passive radiofrequency identification chips, also called passive radiofrequency identification labels, passive RFID (Radio Frequency IDentification) labels, or even transponders, use the energy distributed at short range by the radiofrequency signal sent by the emitting/receiving antenna.

Furthermore, offsetting the emitting/receiving antenna onto the unit carrying the passive chip advantageously allows bringing it as close as possible to the latter, and thus ensure satisfactory transmission between these two elements, in spite of the metallic environment of the turbo-machine that is very likely to interfere with the free circulation of radio waves.

With such a configuration, the passive chip may communicate with the turbo-machine regulation device, preferably of the FADEC type, for example when starting the latter. However, the chip is also likely to communicate with a standard RFID terminal, for example for its programming. In this way, it must be understood that one of the inherent advantages of this invention lies in the possibility, in the production and/or maintenance workshops, of programming the passive chip independently of the regulation device, that is mounted on-board the turbo-machine.

The regulation device may then be programmed to adapt the regulation laws controlling the turbo-machine units, in line with the information transmitted by the passive radiofrequency identification chip to the regulation device, via the emitting/receiving antenna and in response to a verification radiofrequency signal sent by it. Alternatively or simultaneously, this information could lead to the emission of an error signal by the regulation device, if one item of the information verified was analysed as incorrect by this regulation device. More generally, the FADEC type regulation device could be programmed to use the information stored in the passive chip, which it receives by RFID, to carry out all verifications considered to be useful by those skilled in the art, without this leaving the scope of the invention.

By way of illustrative example, if all of the information verified is judged to be correct, then the FADEC type regulation device loads the characterisation data into memory, and makes it available to a regulation software application to optimiser the regulation laws. In return, if the information verified is judged to be incorrect, then the FADEC loads a default characterisation table which permits the mission to be carried out in normal safety conditions, but which offer lower levels of performances.

Still by way of illustrative example, for reasons of operating safety, when there is an abnormal Reset of the FADEC, the latter uses either the default characterisation table in order to limit the initialisation time to the strict minimum while still allowing the mission to be carried out, or the table saved in the novram (NOn Volatile Random Access Memory) when the FADEC is switched on.

In this invention, the ROM type passive chip (Read Only Memory) is preferably only programmable/loadable once, in order to ensure the integrity of the information contained. In this way, the passive read only memory chip, which may not be reprogrammed, is preferably changed at every maintenance operation on the associated turbo-machine unit, or even when this operation leads to a modification of the part number and/or the serial number of the main components of the unit.

A reminder is made that the RFID nature of the transmission of the passive chip information to the emitting/receiving antenna, generally associated to a reader/encoder that is an integral part of the regulation device, is characterised by low or medium frequency operation, which is to say frequencies of between around 9 KHz and several MHz. In a known manner, the magnetic field generated by the emitting/receiving antenna supplies and activates the passive chip, which, to transmit the information it contains, creates an amplitude or phase modulation on the carrier frequency. In this way, the reader receives the information to be verified, and transforms it in binary mode. It is pointed out that for the transmission going from the reader/encoder to the passive chip, via the emitting/receiving antenna, the operation is symmetrical.

Furthermore, it is possible, by means of the data concerning the characterisation of the unit, to optimise the regulation laws by the use of the characterisation tables associated to the unit. It is also possible, by means of the data concerning the P/N and S/N of the main components of the unit, to optimise the management and traceability of the unit concerned. It is also possible, by means of the data concerning the manufacturing and repair dates of the unit, to have advanced management of the traceability of the unit. In fact, using for example a portable reader, connected to a data base, it is possible to follow the entire history of the unit.

By way of illustrative example, the information concerning the unit preferably comprises each of the above-mentioned items of data.

Preferably, still in the aim of improving the RFID transmission, said emitting/receiving antenna is located opposite said passive radiofrequency identification chip, and even more preferably at a distance from this chip less than or equal to 1 cm.

Preferably, said passive radiofrequency identification chip is attached to a removable element of said unit. In this way, the passive chip may be easily fitted onto the removable element at a distance from the unit fitted onto the turbo-machine, then only later taken to this unit, by fitting the removable element.

By way of illustrative example, said removable element of said unit is an element screwed onto a body of the unit, and for example is in the form of a bolt or a plug.

Alternatively, said removable element of said unit may be an identification and characterisation plate of said unit.

Regardless of the choice, said passive radiofrequency identification chip is preferably embedded or forced into said removable element. To this end, it is pointed out that is preferably embedded in resin, and that, in the other case envisaged where it is forced into the removable element, it may also be embedded beforehand in resin before being assembled onto the removable element.

Preferably, said emitting/receiving antenna is also attached to said removable element, even though this could be different, in particular when the removable element is the above-mentioned identification and characterisation plate.

Preferably, said unit is a hydro-mechanical unit or HMU, a fuel monitoring unit or FMU, or any sensor.

Preferably, the control installation according to the invention comprises several turbo-machine units, each equipped with its own verification system communicating with said regulation device.

To achieve this, the following are therefore provided:
several turbo-machine units positioned remotely from said regulation device by which they are controlled, and to which they are electrically connected, and
a specific verification system for each unit, wherein each system comprises:
an emitting/receiving antenna electrically connected to said regulation device,
a passive radiofrequency identification chip comprising an antenna and an electronic chip, wherein said passive radiofrequency identification chip is mounted on said associated unit and incorporates information concerning this same associated unit, wherein said passive radiofrequency identification chip is designed to emit to said emitting/receiving antenna a radiofrequency signal comprising said information, in response to a radiofrequency signal sent by said emitting/receiving antenna for the verification of said associated unit,
said installation is also such that each emitting/receiving antenna is mounted on its associated unit.

In this configuration where one emitting/receiving antenna per passive chip is effectively provided, the installation then preferably comprises a switch with several outputs, each associated to one of the emitting/receiving antennae of the verification systems.

Consequently, by means of the switch, that is preferably analogue, the FADEC type regulation device may "interrogate" alternatively each of the passive chips.

Finally, another subject of the invention is a turbo-machine such as an aircraft turbo jet engine, comprising a control installation such as that described above.

Other advantages and characteristics of the invention will become clearer in the following non-restrictive description below.

This description will be provided in reference to the appended drawings among which;

Figure 1:
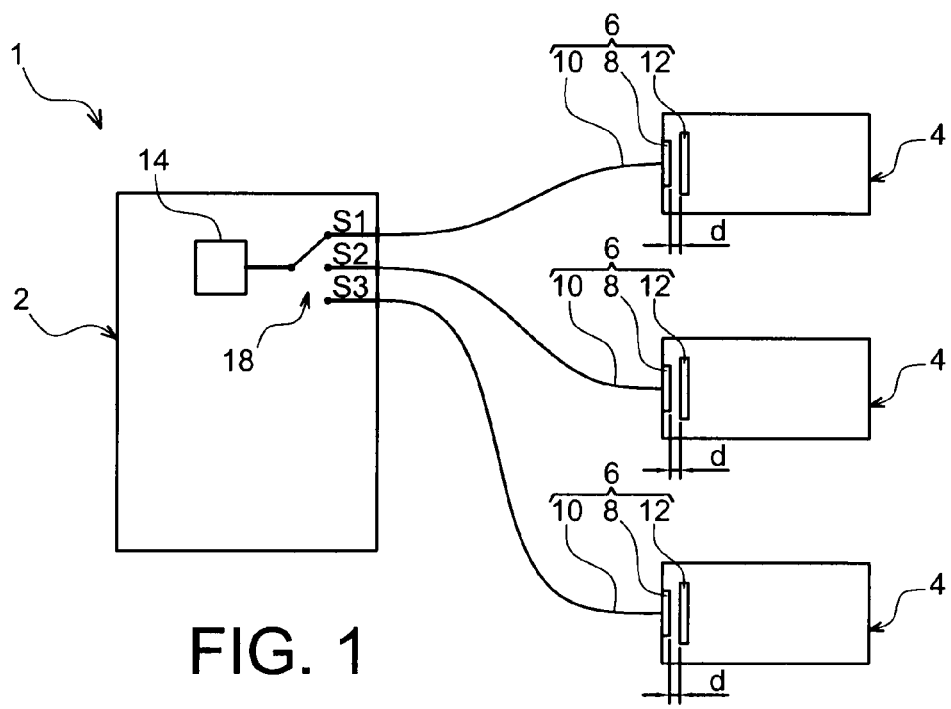
FIG. 1 shows a diagrammatical view of a control installation of an aircraft turbo-machine, according to one preferred embodiment of this invention.

In reference to FIG. 1, a control installation 1 for an aircraft turbo-machine may be seen, according to one preferred embodiment of this invention. This installation 1 comprises a turbo-machine regulation device 2, also called FADEC as previously mentioned, wherein this FADEC 2 is installed on the turbo-machine. Furthermore, the installation 1 is equipped with several turbo-machine units 4, each of which are located remotely from the FADEC 2 which controls it and to which it is electrically connected, by a cable network (not shown) also called a harness. By way of illustrative example, the units 4 are those which are usually found on turbo-machines, which is to say for example hydro-mechanical units or HMUs, fuel monitoring units or FMUs, any sensors, etc.

One of the specific features of this invention lies in the supply, for each of the turbo-machine units 4, of a verification system 6 for the unit concerned, whose main objective is to transmit by RFID information concerning the unit 4 to the FADEC 2 programmed to verify it, and to generate specific actions according to the content of this information.

By way of illustrative example, the FADEC 2 may be programmed to adapt the regulation laws controlling the units 4, according to the information it receives concerning these units. Furthermore, this information could also lead to the emission of an error signal by the FADEC 2, in the case of at least one item of information verified being analysed as incorrect by this FADEC. An item of information judged as incorrect may also prevent the turbo-machine from being started, without this leaving the scope of the invention.

To achieve this, each verification system 6, associated to a given unit 4, comprises an emitting/receiving antenna 8 electrically connected to the FADEC 2, by means of a cable 10, of which one end is in fact electrically connected to the FADEC 2, as shown in FIG. 1. The electrical cable of the antenna is preferably located in the harness corresponding to the unit concerned.

Apart from the emitting/receiving antenna 8, which may be for example in the form of a single loop antenna with an impedance of 50 ohms, each system 6 also features a passive radiofrequency identification chip 12, mounted on its associated unit 4, which is to say remotely from the FADEC 2. The chip 12, also called RFID passive chip or label, is of the read only memory type, and is preferably only programmable/loadable once in order to ensure the integrity of the information it contains concerning the unit 4.

This passive chip 12 may be in any form known to those skilled in the art, and therefore features classically an antenna and an electronic chip in which the information concerning the unit 4 is stored.

The transmission of the information may therefore be carried out in a manner that is itself known, which is to say via RFID. In this way, the FADEC 2 comprises a reader/encoder 14 capable of emitting, via the emitting/receiving antenna 8 of the system 6, a radiofrequency signal to verify the unit 4 concerned, which is to say to verify the data loaded in the electronic chip. When this signal is sent, the magnetic field generated by the emitting/receiving antenna 8 supplies and activates the passive chip 12, which in return, to transmit the information that it contains, creates an amplitude or phase modulation on the carrier frequency. This is translated by the transmission of a radiofrequency signal containing the information concerning the unit 2, a signal which is then received by the antenna 8, and sent by the latter to the reader/encoder 14, transforming it into binary mode so that it may be used by the FADEC 2. By way of illustrative example, this use may for example be a comparison of the information stored in the passive chip 12, with the updated information stored in a rewritable memory of the FADEC 2.

This information on the units 4 may be of any order, only a few examples are provided below by way of illustrative example. In fact this may concern data concerning the characterisation of the unit, data concerning the P/N and S/N of the main components of the unit, data concerning the dates of manufacture and repair of the unit, or even data concerning the manufacturer of the unit, in the form of a specific encrypted code.

Another specific feature of this invention lies in the fact that the emitting/receiving antenna 8 is mounted on the unit 4 to which it is associated, as shown diagrammatically in FIG. 1. More specifically, in order to improve the RFID transmission that may be disrupted by the metallic environment of the turbo-machine, the emitting/receiving antenna 8 is located opposite the passive chip 12, at a distance "d" from it that is less than or equal to 1 cm. Preferably, the antenna 8 and the passive chip 12 are positioned in two parallel planes.

The reader/encoder 14 is preferably common to each of the verification systems 6, even though this could be different, without this leaving the scope of the invention. In this configuration, where one emitting/receiving antenna 8 is provided per passive chip 12, the installation 1 thus features an analogue switch 18 electrically connected to the reader 14, and comprising as many outputs as units 4 equipped with a passive chip 12. In the diagrammatical case of FIG. 1 where three units 4 have been provided, each of the three outputs S1, S2, S3 of the switch 18 is associated to one of the three emitting/receiving antennae 8 respectively belonging to the three verification systems 6. As shown in FIG. 1, it is one of the ends of the antenna cable 10 that is connected to one of the outputs S1, S2, S3, the other end of the antenna cable 10 being connected to the antenna 8.

Consequently, by means of the switch 18 controlled by the FADEC 2 to which it belongs, the latter may alternatively interrogate each of the passive chips 12 to verify the information concerning the unit housing the chip 12 interrogated, wherein these passive chips 12 are thus only electrically powered by the associated antenna 8 during the interrogation. As the chips are preferably only interrogated when the turbo-machine is started, the result is that none of them are powered during the flight of the aircraft.

Figure 2:
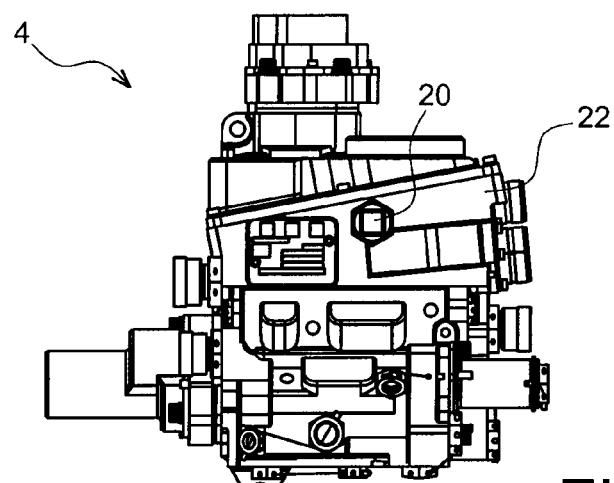
FIG. 2 shows a detailed end view of one of the turbo-machine units that is part of the control installation shown in FIG. 1.
Figure 3:
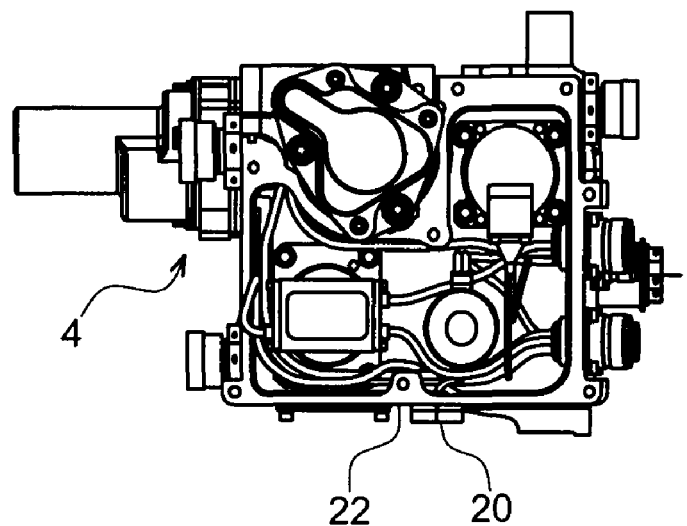
FIG. 3 shows a detailed top view of the unit shown in FIG. 2.

In reference to FIGS. 2 and 3, one of the turbo-machine units 4 can be seen in more detail, and more precisely a fuel monitoring unit or FMU.

Figure 4:
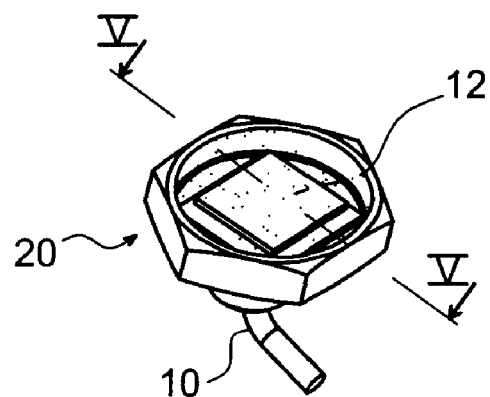
FIG. 4 shows a perspective view of a removable plug of the unit shown in FIGS. 2 and 3, incorporating a passive radiofrequency identification chip.

One of the specific features of this preferred embodiment lies in the presence of a removable element 20 of the screwed plug or bolt type, mounted by means of a screw thread onto the body 22 of the unit, and more preferably on one face of this body so that it may be easily fitted/removed by an operator. The specific feature of this screwed element 20 is that it acts as a housing for the passive chip 12 as shown in FIG. 4, and preferably also for the installation of the emitting/receiving antenna 8. By way of illustrative example, in the case of a plug being used, the later may simultaneously be used to block a tank of fluid built into the unit 4.

Figure 5:
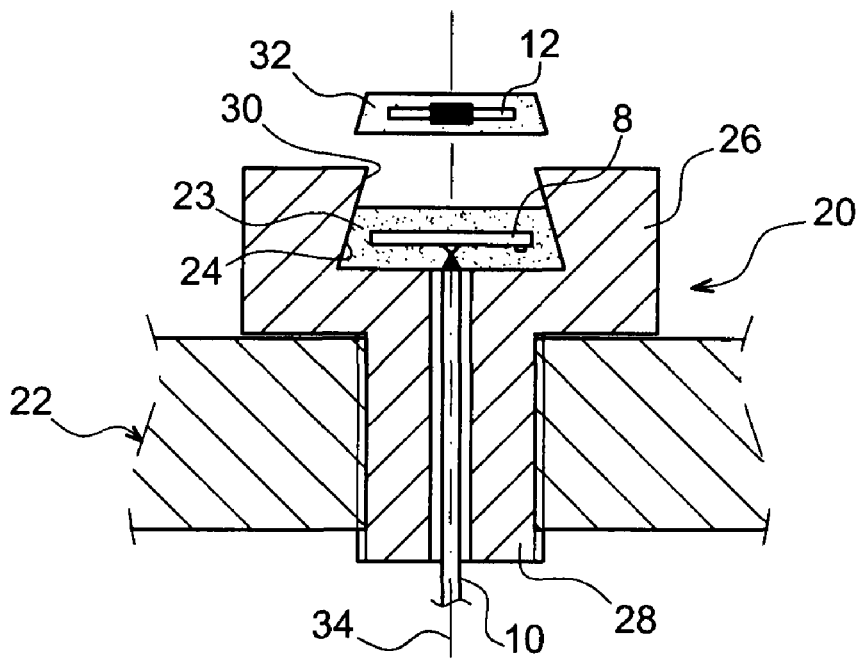
FIG. 5 is a cross sectional view shown along the V-V line of FIG. 4, wherein the removable plug is shown in an occupied state prior to the passive chip being fitted.
Figure 6:
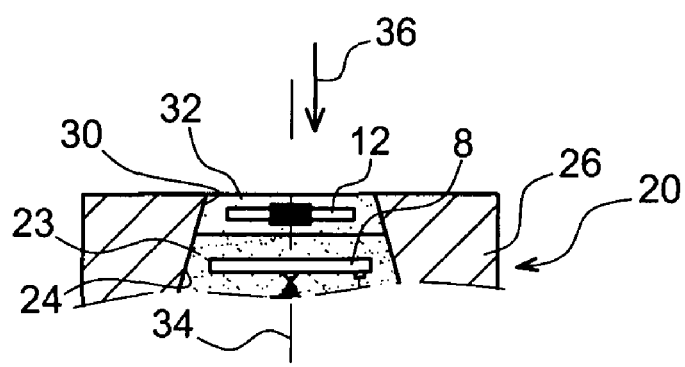
FIG. 6 is a partial view of FIG. 5, in which the passive chip is shown mounted on the removable plug.

More precisely in reference to FIGS. 5 and 6, it can be seen that the emitting/receiving antenna 8 is attached to the removable element 20, as it is embedded by means of resin 23 in a receptacle 24 in the head 26 of the element 20. As can be seen in FIG. 5, the bolt head 26 extends in a threaded portion 28 screwed onto the face of the body 22, wherein the antenna cable 10 connected electrically to the antenna 8 at one of its ends passes through this threaded portion 28.

Furthermore, the bolt head 26 forms along with the block of resin 23 another open receptacle 30, designed to accommodate the passive chip 12. To achieve this, the latter is preferably first embedded into resin 32 to form a block whose form is complementary to that of the open receptacle 30, whose base is formed by the resin 23 coating the antenna 8. This form is for example trapezoidal in its longitudinal section passing through the axis 34 of the removable element 20, or any other form permitting a forced/clipped assembly of the block incorporating the passive chip 12, in the open receptacle 30.

This configuration advantageously allows quick and easy replacement of the passive chip 12, as it is sufficient to destroy that initially planned in the receptacle 30, to remove it and to force in a new resin block incorporating the new passive chip 12, into the receptacle 30 as shown by the arrow 36.

Naturally, the passive chip 12 may be directly embedded into the plug 20 so as to form a single part together with it, which nevertheless would mean sacrificing the entire plug 20 if the passive chip 12 were to be changed, for example after carrying out a maintenance operation on the unit concerned.

Furthermore, a solution cold also be envisaged in which the antenna 8 would not form a single part with the plug 20, but in which it would be removable, without this leaving the scope of the invention.

Figure 7:
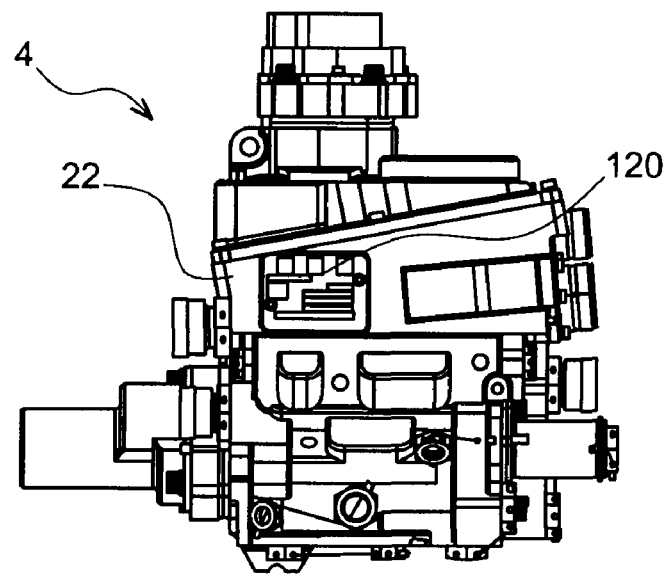
FIG. 7 shows a detailed side view of one of the turbo-machine units that is part of the control installation shown in FIG. 1, wherein the unit is in the form of another preferred embodiment of this invention.
Figure 8:
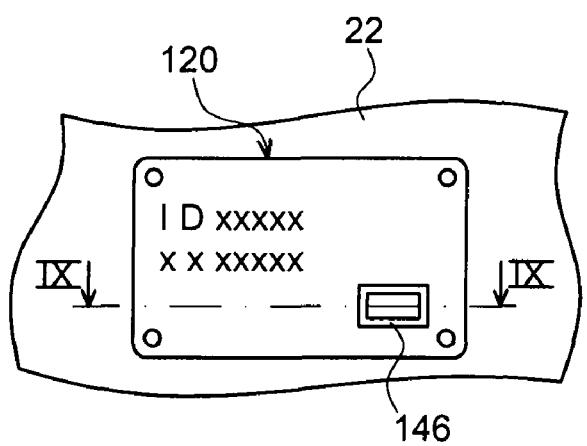
FIG. 8 shows a partial and enlarged view of that shown in FIG. 7, showing an identification and characterisation plate of the unit, on which is mounted a passive radiofrequency identification chip.
Figure 9:
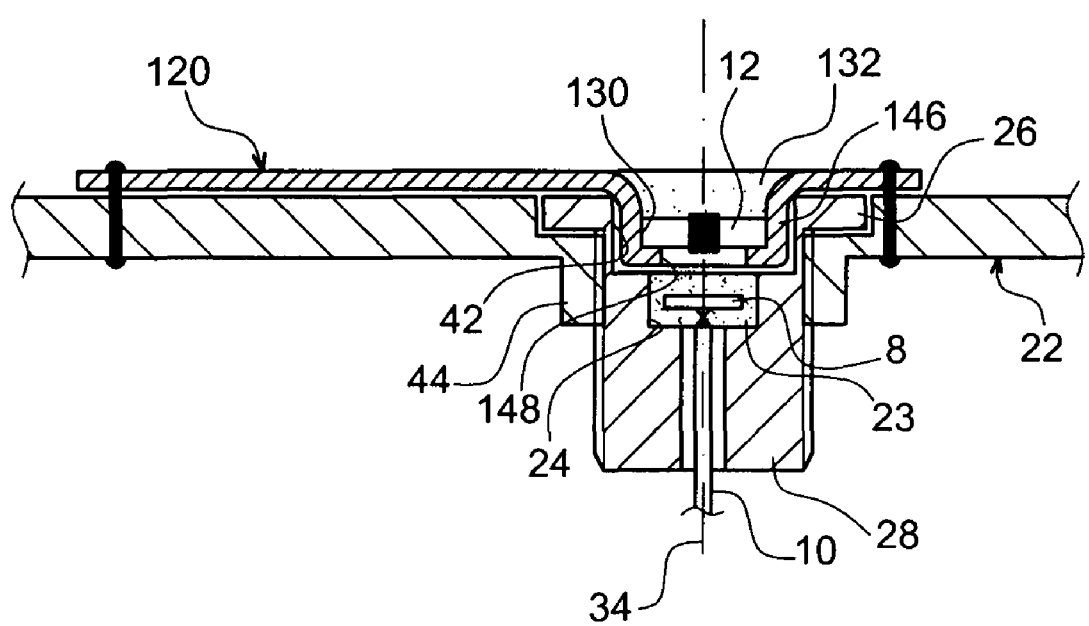
FIG. 9 is a cross sectional view shown along the IX-IX line of FIG. 8, in which the passive chip is shown mounted on the identification and characterisation plate.

In reference to FIGS. 7 to 9, another preferred embodiment may be seen in which the removable element housing the passive chip 12 is no longer a screwed plug, but an identification and characterisation plate 120 of the unit 4. This plate 120, which may be screwed or rivetted onto the face of the body 22, has the specific feature of featuring a stamped pierced portion 146 forming a housing for the passive chip 12.

In fact, the stamped pierced portion 146 forms a receptacle 130 in which the passive chip 12 may be placed, before a block of resin 132 is poured into this receptacle so that the chip 12 and the plate 120 form a single part.

As shown in FIG. 9, the stamped portion 146 in the direction of the face of the body 22 penetrates into a receptacle 42 of a plug or a bolt 20 whose design is substantially similar to that described above, especially in that the removable element 20 incorporates the emitting/receiving antenna 8. Furthermore, the elements bearing the same numerical references correspond to identical or similar elements.

When the plug 20 is screwed onto a threaded portion 44 of the face, and the plate 120 covers part of the face as well as the head 26 of the plug 20 inside which the stamped pierced portion 146 penetrates, the chip 12 and the antenna 8 are situated opposite one another, less than 1 cm apart, preferably on either side of the opening 148 of the stamped pierced portion 146.

In this configuration, changing the passive chip 12 requires the entire plate 120 to be sacrificed, which nevertheless permits the coherency between the information marked on the plate 120, and that stored on the passive chip 12 to be guaranteed. However, a removable mounting of the passive chip 12 on the plate 120 could be envisaged, without this leaving the scope of the invention, by providing for example that this chip 12 could be forced into the plate 120.

Another possibility could also consist is attaching the antenna 8 to the plate 120, by mounting it on the latter so that it is removable or non removable.

Of course, those skilled in the art could make various modifications to the invention that has been described above, provided by way of non-restrictive examples.

The invention claimed is:

1. Control installation of a turbo-machine, characterised in that it comprises:
    a turbo-machine regulation device,
    at least one turbo-machine unit located remotely from said regulation device by which it is controlled, and to which it is electrically connected, and
    a verification system of said unit, said system featuring:
    an emitting/receiving antenna electrically connected to said regulation device,
    a passive radiofrequency identification chip comprising an antenna and an electronic chip, wherein said passive radiofrequency identification chip is mounted on said unit and incorporates information concerning this same unit, wherein said passive radiofrequency identification chip is designed to emit to said emitting/receiving antenna a radiofrequency signal comprising said information, in response to a radiofrequency signal sent by said emitting/receiving antenna to verify said unit,
    said installation is also characterised in that said emitting/receiving antenna is mounted on said unit, and in that said information concerning the unit comprises at least one of the following items of data:
    data concerning the characterisation of the unit,
    data concerning the part number and serial number of the main components of the unit,
    data concerning the manufacturing and repair dates of the unit,
    data concerning the manufacturer of the unit, in the form of a specific encrypted code.

2. Control installation according to claim 1, characterised in that said emitting/receiving antenna is positioned opposite said passive radiofrequency identification chip.

3. Control installation according to claim 1 or claim 2, characterised in that said emitting/receiving antenna is positioned at a distance (d) from said passive radiofrequency identification chip less than or equal to 1 cm.

4. Control installation according to claim 1, characterised in that said passive radiofrequency identification chip is attached to a removable element of said unit.

5. Control installation according to claim 4, characterised in that said removable element of said unit is a screwed element on a body of the unit.

6. Control installation according to claim 5, characterised in that said screwed element is in the form of a bolt or a plug.

7. Control installation according to claim 4, characterised in that said removable element of said unit is an identification and characterisation plate of said unit.

8. Control installation according to claim 4, characterised in that said passive radiofrequency identification chip is embedded or forced into said removable element.

9. Control installation according to claim 4, characterised in that said emitting/receiving antenna is also attached to said removable element.

10. Control installation according to claim 1, characterised in that said unit is a hydro-mechanical unit, a fuel monitoring unit or a sensor.

11. Control installation according to claim 1, characterised in that it comprises:
    several turbo-machine units positioned remotely from said regulation device by which they are controlled, and to which they are electrically connected, and
    a verification system specific to each unit, wherein each system features:
    an emitting/receiving antenna electrically connected to said regulation device,
    a passive radiofrequency identification chip comprising an antenna and an electronic chip, wherein said passive radiofrequency identification chip is mounted in said associated unit and incorporates information concerning this same associated unit, wherein said passive radiofrequency identification chip is designed to emit to said emitting/receiving antenna a radiofrequency signal comprising said information, in response to a radiofrequency signal sent by said emitting/receiving antenna to verify said associated unit,
    wherein said installation is also characterised in that each emitting/receiving antenna is mounted on its associated unit.

12. Control installation according to claim 11, characterised in that it features a switch comprising several outputs each associated to one of the emitting/receiving antennae of the verification systems.

13. Turbo-machine comprising a control installation according to claim 1.

* * * * *